United States Patent Office 2,779,941
Patented Jan. 29, 1957

2,779,941

TRICHLOROMETHANE SULPHENIC ACID DERIVATIVES AND THEIR USE IN THE COMBATTING OF FUNGI

Hans Gysin and Alfred Margot, Basel, Switzerland, assignors to J. R. Geigy A. G., Basel, Switzerland No Drawing. Original application October 27, 1953, Serial No. 388,674. Divided and this application March 16, 1956, Serial No. 571,900

2 Claims. (Cl. 260—556)

The present invention is concerned with new trichloromethane sulphenic acid derivatives, their production and their use in combatting fungi. U. S. Patent No. 2,553,775 claims trichloromethane sulphenic acid amides, the amide group of which is substituted by an acyl radical. As compounds with a sulphonic acid radical as acyl substituent of the amide group, benzene sulphone-N-trichloromethane sulphenyl anilide and benzene sulphone-N-trichloromethane sulphenyl-N-butyl amide are cited. On the other hand, trichloromethane sulphenamides acylated by methane sulphonic acid have not been known up to the present. It has now been found that such compounds of the general formula:

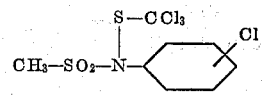

have a strong fungicidal action. The fungicidal action of these anilides of the methane sulphonic acid is by far superior to that of the two known amides of the aromatic benzene sulphonic acid above mentioned. Some of the compounds in addition have a bactericidal action. These compounds are particularly suitable for combatting fungi which are plant parasites; in the concentration necessary to attain a fungicidal action, no damage is caused to the host plants.

The new compounds can be obtained by reacting sulphonic acid amides or salts thereof of the general formula:

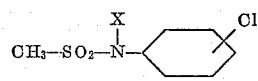

wherein X represents hydrogen or another monovalent cation such as an alkali metal cation, with trichloromethane sulphenyl chloride (perchloromethyl mercaptan). Good yields are obtained.

The reactions mentioned above can be performed in water or in inert organic solvents. If salts of the sulphonic acid amides are not used as starting materials, the reaction can be accelerated by the addition of acid binding agents, in water e. g. with caustic soda lye. It can be accelerated in organic solvents also with sodium or potassium carbonate or acetate or also with tertiary organic bases.

N-methane sulphonyl derivatives of 2-, 3- and 4-chloraniline are the sulphonic acid amides of the general formula:

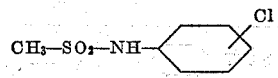

which can be obtained easily by treating the corresponding amines with the methane sulphochloride, e. g. in pyridine or in an inert solvent in the presence of a tertiary base.

The new N-trichloromethane sulphenyl amides of methane sulphonic are solid crystalline bodies. The following examples serves to illustrate the invention further. Parts are given as parts by weight and the relationship of parts by weight to parts by volume is as that of grammes to cubic centimetres. The temperatures are in degrees centigrade.

EXAMPLE 1

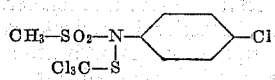

20.5 parts of methane sulphone-4-chloranilide are dissolved in 200 parts by volume of 0.5 N-caustic soda lye and, while stirring well at about 10°, 18.6 parts of perchloromethyl mercaptan are added. After stirring for some hours at room temperature, caustic soda lye is added to the reaction mixture which by this time has an acid reaction, until the reaction is phenolphthalein alkaline. The precipitate is drawn off under suction and washed well with water. The methane sulphone-N-trichloromethane sulphenyl-4-chloranilide so obtained melts at 114–115° after recrystallisation from cyclohexane.

Methane sulphone-N-trichloromethane sulphenyl - 2-chloranilide (M. P. 129–130°) for example can be produced in the same way.

The excellent fungicidal activity of the new compounds according to this invention can be seen from the results of slide germination tests which are summarised in the following tables.

In the tables, that amount of the tested compounds is given in γ per square centimetre which was able to prevent the germination in a damp atmosphere of at least 9/10 of the pores spread on the slides. The active coatings were obtained by distributing uniformly the acetone solution of the compounds in different concentrations on the slides and allowing the solvent to evaporate; 4 slides were used for each coating tested of each compound.

Table I

| No. | Compound (T=—S—CCl₃) | Necessary amount in γ per cm.² to prevent germination of the spores of— | | | | | | |
|---|---|---|---|---|---|---|---|---|
| | | Alternaria Rosae | Alternaria tenuis | Botrytis chinerea | Coniothyrium diplodiella | Fusarium culmorium | Macrosporium spec. | Penicillium crustaceum |
| 1 | CH₃—SO₂—NT—⟨Cl⟩ | 13 | 13 | 1.3 | 13 | 13 | 13 | 13 |
| 2 | CH₃—SO₂—NT—⟨⟩—Cl | 1.3 | 1.3 | 1.3 | 1.3 | 1.3 | 1.3 | 1.3 |

Contrary to the new methane sulphone-N-trichloromethane sulphenyl anilides, the benzene sulphone-N-trichloromethane sulphenyl anilide inhibits the germination of the spores of only one of the three fungi which were tested, as shown in Table II.

Table II

| No. | Compound ($T=-S-CCl_3$) | Necessary amount in γ per cm² to inhibit the germination of the spores of— | | |
|---|---|---|---|---|
| | | Alternaria solani | Fusarium culmorum | Penicillium italicum |
| 2 | $CH_3-SO_2-NT-\langle\rangle-Cl$ | 13 | 1.3 | 13 |
| 3 | $\langle\rangle-SO_2-NT-\langle\rangle$ | inactive at 130 | 1.3 | inactive at 130 |

In field trials, compound No. 2, methane sulphone-N-trichloromethane sulphenyl-4-chloranilide, gave particularly good results.

The new sulphenic acid amide derivatives can be used for the protection of plants and parts thereof from attack by injurious fungi, either as such or combined with suitable carriers and dispersing agents and also if desired with other fungicidal or insecticidal substances. They are suitable for the treatment of organic materials such as, e. g. wood, textiles, hides and leather.

For example, the active ingredients can be combined with solid pulverulent carriers such as, e. g. talc, kaolin, bole, bentonite, chalk, ground limestone, and the pulverulent fungicides so obtained can be made water suspendible if desired by the addition of wetting and dispersing agents. Further, the active ingredients can be dispersed in water with the aid of suitable emulsifying agents or dissolved in organic solvents, e. g. chlorinated hydrocarbons such as trichlorethylene or in medium petroleum fractions, if desired with the addition of auxiliary solvents such as acetone or higher ketones. Another use for the active ingredients is their dispersal in the air in the form of aerosols, smoke or steam, in particular, e. g. in store rooms and greenhouses.

EXAMPLE 2

By grinding 10 parts of active ingredient with 82 parts of kaolin or chalk and mixing with 8 parts of wetting and dispersing agents, e. g. 8 parts of sulphite waste liquor, a concentrate is obtained which, on mixing with water, gives a fungicidal spraying agent which is excellently suited for the treatment of the parts of plants above the ground. Methane sulphone - N - trichloromethane sulphenyl-4-chloranilide can be used as active ingredient.

EXAMPLE 3

A concentrate for the production of emulsions is obtained by mixing 25 parts of methane sulphonic acid-N-trichloromethane sulphenyl-4-chloranilide, 67 parts of xylene and 8 parts of a polyethylene oxide esterified with ricinoleic acid.

1 part of this concentrate is dispersed in 200 to 50 parts of water to give agents ready for use containing 0.05 to 0.5% of active ingredient.

What we claim is:

1. Trichloromethane sulphenic acid derivatives corresponding to the general formula:

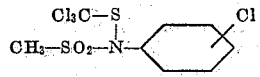

2. The compound of the formula:

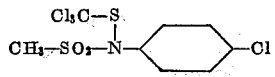

References Cited in the file of this patent

UNITED STATES PATENTS 2,553,770    Kittleson             May 22, 1951